US008343578B2

(12) United States Patent
Kim et al.

(10) Patent No.: US 8,343,578 B2
(45) Date of Patent: Jan. 1, 2013

(54) SELF-ASSEMBLED LAMELLAR MICRODOMAINS AND METHOD OF ALIGNMENT

(75) Inventors: Ho-Cheol Kim, San Jose, CA (US); Charles Thomas Rettner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 11/554,079

(22) Filed: Oct. 30, 2006

(65) Prior Publication Data

US 2008/0103256 A1  May 1, 2008

(51) Int. Cl.
  B05D 5/00  (2006.01)
  B05D 3/02  (2006.01)
  B05D 3/12  (2006.01)
(52) U.S. Cl. ........ 427/226; 427/558; 427/240; 427/256; 427/352; 427/427.4; 427/430.1; 216/11
(58) Field of Classification Search .................. 427/240, 427/226, 256
See application file for complete search history.

(56) References Cited

U.S. PATENT DOCUMENTS

| | | | |
|---|---|---|---|
| 6,565,763 B1 * | 5/2003 | Asakawa et al. ................ | 216/56 |
| 6,893,705 B2 | 5/2005 | Thomas et al. | |
| 2003/0185741 A1 | 10/2003 | Matyjaszewski et al. | |
| 2003/0185985 A1 * | 10/2003 | Bronikowski et al. ........ | 427/258 |
| 2004/0050816 A1 | 3/2004 | Asakawa et al. | |
| 2004/0096586 A1 | 5/2004 | Schulberg et al. | |
| 2004/0187917 A1 | 9/2004 | Pichler | |
| 2004/0242792 A1 | 12/2004 | Sotzing | |
| 2006/0021647 A1 | 2/2006 | Gui et al. | |
| 2006/0078681 A1 * | 4/2006 | Hieda et al. .................... | 427/307 |
| 2009/0170342 A1 * | 7/2009 | Kim et al. ..................... | 438/780 |

OTHER PUBLICATIONS

Segalman, Rachel A.; Patterning with block copolymer thin films; Materials Science and Engineering R 48 (2005); pp. 191-226.
Pickett, et al.; Equilibrium Surface Orientation of Lamellae; Marcomolecules, vol. 26, No. 12; 1993; pp. 3194-3199.
Tsori, et al.; Parallel and Perpendicular Lamellae on Corrugated Surfaces; Macromolecules, vol. 36, No. 22; 2003; pp. 8560-8566.

* cited by examiner

Primary Examiner — Kirsten C Jolley
(74) Attorney, Agent, or Firm — Schmeiser, Olsen & Watts (57) ABSTRACT

A method and associated structure. A substrate is provided. The substrate has an energetically neutral corrugated surface layer. A film is formed on the corrugated surface layer. The film includes a combination of a di-block copolymer and a stiffening compound. The di-block copolymer includes lamellar microdomains of a first polymer block and lamellar microdomains of a second polymer block. The stiffening compound is dissolved within the first polymer block. At least one lamellar microdomain is removed from the film such that an oriented structure remains on the surface layer.

20 Claims, 9 Drawing Sheets

SELF-ASSEMBLED LAMELLAR MICRODOMAINS AND METHOD OF ALIGNMENT

FIELD OF THE INVENTION

The invention relates to material compositions and methods for aligning lamellar microdomains of block copolymers on substrates.

BACKGROUND OF THE INVENTION

The imaging processes used in current commercial microelectronic production are based almost entirely on optical lithography. Current lithographic techniques are based on a "top-down" approach, wherein patterns are imaged onto a resist using a mask to form shapes that are transferred into the substrate by further processing. However it is becoming increasingly difficult and expensive to extend this approach to create patterns with dimensions on the nanometer scale. Accordingly, there exists a need for a practical and economical approach to create patterns with dimensions on the nanometer scale.

SUMMARY OF THE INVENTION

The present invention relates to a method comprising:
providing a di-block copolymer, said di-block copolymer comprising a first block of a first polymer, said first block being covalently bonded to a second block of a second polymer to form a repeating unit of the di-block copolymer, said first and second polymers being different;
providing a substrate having an energetically neutral surface, said surface having a corrugation integrally disposed thereon, said corrugation characterized by a direction of corrugation;
providing a third material, said third material being miscible with said first polymer;
combining said di-block copolymer with said third material to form a combination of said di-block copolymer and said third material;
forming a film of said combination onto said corrugated surface; and
assembling lamellar microdomains of said di-block copolymer within said film, said microdomains forming self-assembled structures within said film, said structures having an orientational direction substantially normal to said direction of corrugation and substantially parallel to said surface, wherein presence of said third material within said first block induces lamellar microdomains of said di-block copolymer to align with respect to said corrugated surface, after said film is formed on said corrugated surface.

The present invention relates to a method comprising:
providing a substrate, said substrate having an energetically neutral corrugated surface;
forming a film on said corrugated surface, said film comprising a combination of a di-block copolymer and a stiffening compound, said di-block copolymer comprising lamellar microdomains of a first polymer block and lamellar microdomains of a second polymer block, where said stiffening compound is dissolved within said first polymer block; and
removing at least one lamellar microdomain from said film such that an oriented structure remains on said surface.

The present invention relates to a structure comprising:
a substrate having a surface, said surface configured to induce a di-block copolymer to form lamellar microdomains, said surface being corrugated, said corrugated surface having a direction of corrugation;
a di-block copolymer film disposed onto said surface, where said di-block copolymer comprises a first block comprising a first polymer, said first block being covalently bonded to a second block comprising a second polymer to form a repeating unit of the di-block copolymer, said first and second polymers being different; and
a third material, said third material being dissolved in said first polymer of said first block, wherein lamellar microdomains of said di-block copolymer are aligned with respect to said direction of corrugation due to the presence of said third material within said first block.

The present invention provides a practical and economical approach to create patterns with dimensions on the nanometer scale.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings.

DETAILED DESCRIPTION OF THE INVENTION

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as examples of embodiments. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

The following are definitions:

A monomer as used herein is a molecule that can undergo polymerization thereby contributing constitutional units to the essential structure of a macromolecule, an oligomer, a block, a chain, and the like.

A polymer as used herein is a macromolecule comprising multiple repeating smaller units or molecules (monomers) derived, actually or conceptually, from smaller units or molecules, bonded together covalently or otherwise. The polymer may be natural or synthetic.

A copolymer as used herein is a polymer derived from more than one species of monomer.

A block copolymer as used herein is a copolymer that comprises more than one species of monomer, wherein the monomers are present in blocks. Each block of the monomer comprises repeating sequences of the monomer. A formula (1) representative of a block copolymer is shown below:

$$-(A)_a-(B)_b-(C)_c-(D)_d- \tag{1}$$

wherein A, B, C, and D represent monomer units and the subscripts "a", "b", "c", and "d", represent the number of repeating units of A, B, C, and D respectively. The above referenced representative formula is not meant to limit the structure of the block copolymer used in an embodiment of the present invention. The aforementioned monomers of the copolymer may be used individually and in combinations thereof in accordance with the method of the present invention.

A di-block copolymer has blocks of two different polymers. A formula (2) representative of a di-block copolymer is shown below:

$$-(A)_m-(B)_n- \tag{2}$$

where subscripts "m" and "n" represent the number of repeating units of A and B, respectively. The notation for a di-block copolymer may be abbreviated as A-b-B, where A represents the polymer of the first block, B represents the polymer of the second block, and -b- denotes that it is a di-block copolymer of blocks of A and B. For example, PS-b-PEO represents a di-block copolymer of polystyrene (PS) and poly(ethylene oxide) (PEO).

A crosslinkable polymer as used herein is a polymer having a small region in the polymer from which at least one polymer chain may emanate, and may be formed by reactions involving sites or groups on existing polymers or may be formed by interactions between existing polymers. The small region may be an atom, a group of atoms, or a number of branch points connected by bonds, groups of atoms, or polymer chains. Typically, a crosslink is a covalent structure but the term is also used to describe sites of weaker chemical interactions, portions of crystallites, and even physical interactions such as phase separation and entanglements.

Morphology as used herein describes a form, a shape, a structure, and the like of a substance, a material, and the like as well as other physical and chemical properties (e.g., Young's Modulus, dielectric constant, etc. as described infra).

Amphiphilic as used herein is used to describe a molecule and a macromolecule that is or has in part both polar and non-polar portions that constitute the molecule and the macromolecule.

Thermosetting polymer as used herein is a polymer or a prepolymer in a soft solid or viscous state that changes irreversibly into an infusible, insoluble polymer network by curing. Typically, curing can be by the action of heat or radiation causing the production of heat, or both. Further, curing can be by the action of heat and/or radiation that produces heat resulting in the generation of a catalyst which serves to initiate crosslinking in the region of exposure.

Photosetting polymer as used herein is a polymer or a prepolymer in a soft solid or viscous state that changes irreversibly into an infusible, insoluble polymer network by curing. Typically, curing can be by the action of exposing the polymer or prepolymer to light (UV, IR, visible, etc). Further, curing can be by the action of exposure to radiation resulting in the generation of a catalyst which serves to initiate crosslinking in the region of exposure.

Nanostructure as used herein is a structure on the order of 1 nanometer (nm) to 500 nm in dimension. Examples of the structure may include but are not limited to nanorods, nanosheets, nanospheres, nanocylinders, nanocubes, nanoparticles, nanograins, nanofilaments, nanolamellae, and the like having solid composition and a minimal structural diameter in a range from about 1 nm to about 500 nm. Further examples of the structure may include but are not limited to spherical nanopores, cylindrical nanopores, nanotrenches, nanotunnels, nanovoids, and the like having their void or shape defined by the material or matrix that surrounds them and having a diameter in a range from about 1 nm to about 500 nm.

A substrate, as used herein, is a physical body (e.g., a layer or a laminate, a material, and the like) onto which a polymer or polymeric material may be deposited or adhered. A substrate may include materials of the Group I, II, III, and IV elements; plastic material; silicon dioxide, glass, fused silica, mica, ceramic, or metals deposited on the aforementioned substrates, and the like.

An energetically neutral surface, as used herein, is a surface whose chemical and morphological composition affords substantially no preferential or selective affinity for either polymer block in a block copolymer or an associated functional group or moiety, such as through ionic bonds, dipole-dipole forces, hydrogen bonding, and similar intermolecular forces.

Figure 1:
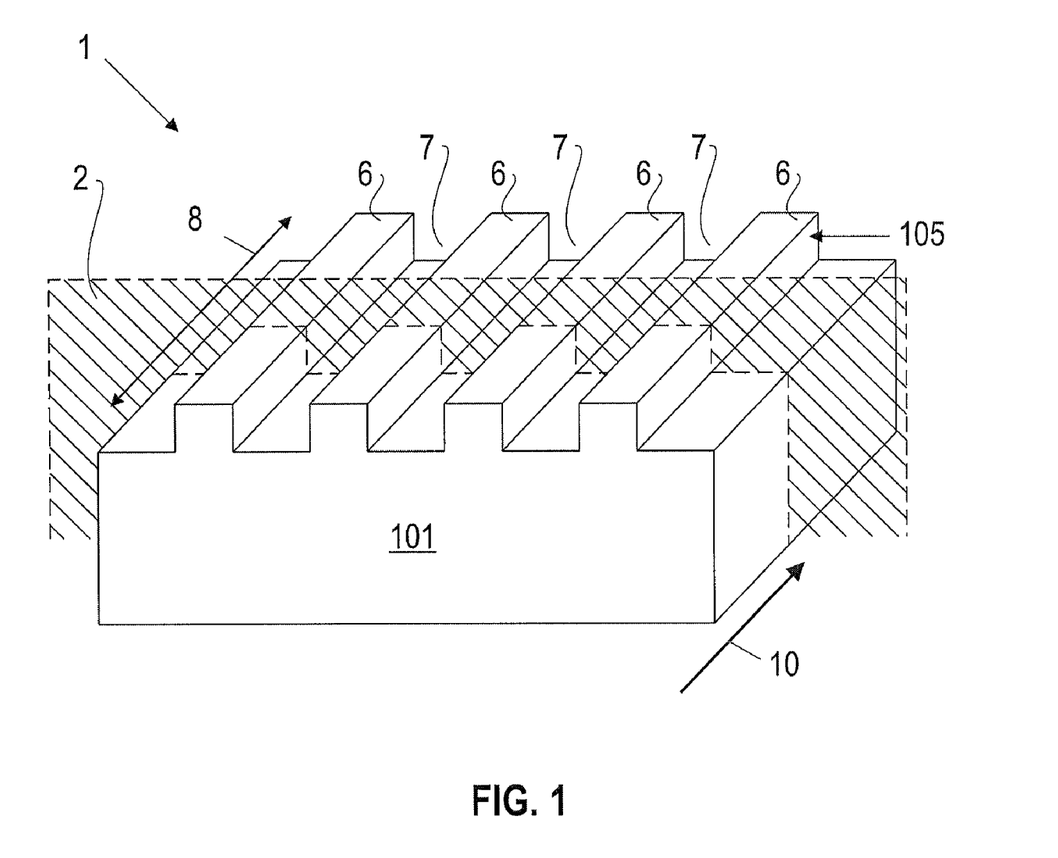
FIG. 1 is a perspective representation of a substrate having a substrate layer and a surface layer characterized by corrugation, in accordance with embodiments of the present invention.

FIG. 1 is a perspective representation of a substrate 1 having a substrate layer 101 and a surface layer 105 integrally disposed thereon. The surface layer 105 may be characterized by corrugation comprising a plurality of parallel ridges 6, where successive parallel ridges 6 may be separated by parallel grooves 7. The ridges 6 and grooves 7 may have a minimum length 8 of about 40 nm, for example. The corrugation may be characterized by a direction of corrugation 10, such as the direction of the parallel grooves 7 and ridges 6 along the corrugated surface layer 105. The corrugated surface layer may alternatively be characterized by a single ridge 6 or groove 7, or alternatively a plurality of parallel ridges 6 and/or grooves 7, where a ridge 6 may have a shape of a line, an arc, an angle, a combination thereof, and the like.

Figure 2:
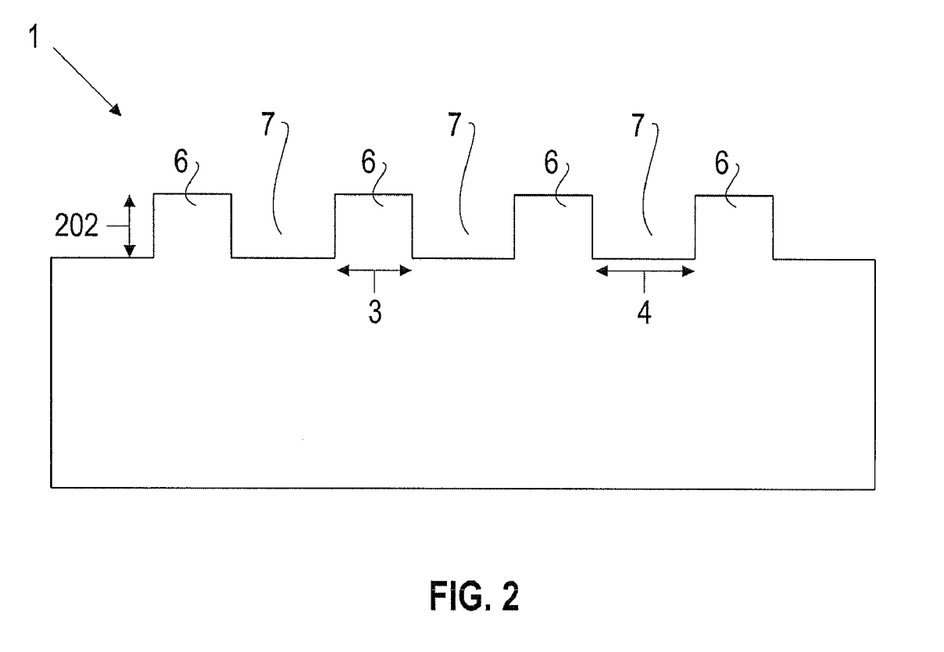
FIG. 2 is a cross-sectional view of section of FIG. 1 through plane 2, in accordance with embodiments of the present invention.

FIG. 2 is a cross-sectional view of section of FIG. 1 through plane 2. FIG. 2 shows an embodiment where a ridge 6 may have a peak height 202 of about 10 nanometers (nm) to about 50 nm, and a base width 3 of about 10 nm to about 50 nm. Adjacent parallel ridges 6 may be separated by parallel grooves 7 and a distance 4 within a range from about 50 nm to about 500 nm.

These examples are not meant to limit the shape, size, or orientation of the topography of the corrugation. The substrate may alternatively be described as having an anisotropy or being one-dimensionally rough.

Figure 3A:
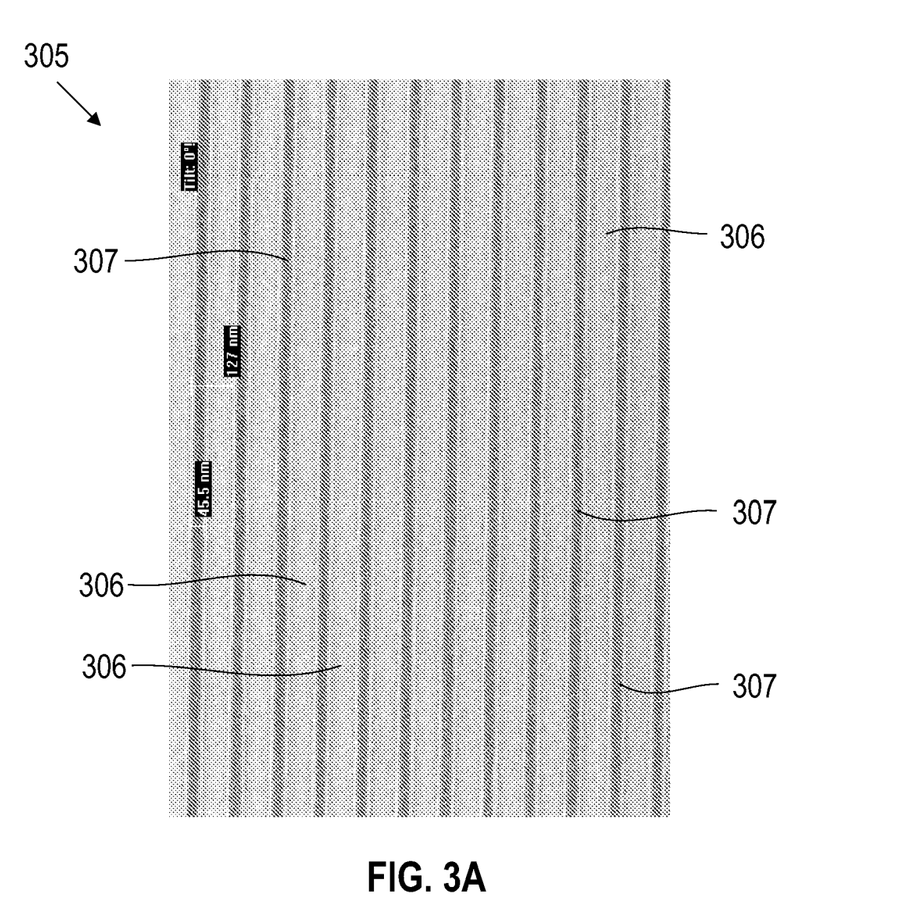
FIG. 3A is a scanning electron microscope (SEM) image of a plan view of a substrate with a corrugated surface, in accordance with embodiments of the present invention.

FIG. 3A is a scanning electron microscope (SEM) image of a plan view of a substrate having an energetically neutral, corrugated surface layer 305 prepared using electron beam lithography (hereafter abbreviated as e-beam lithography), depicting a plurality of grooves 307 (appearing as dark vertical lines) and ridges 306 (appearing as light vertical lines).

Figure 3B:
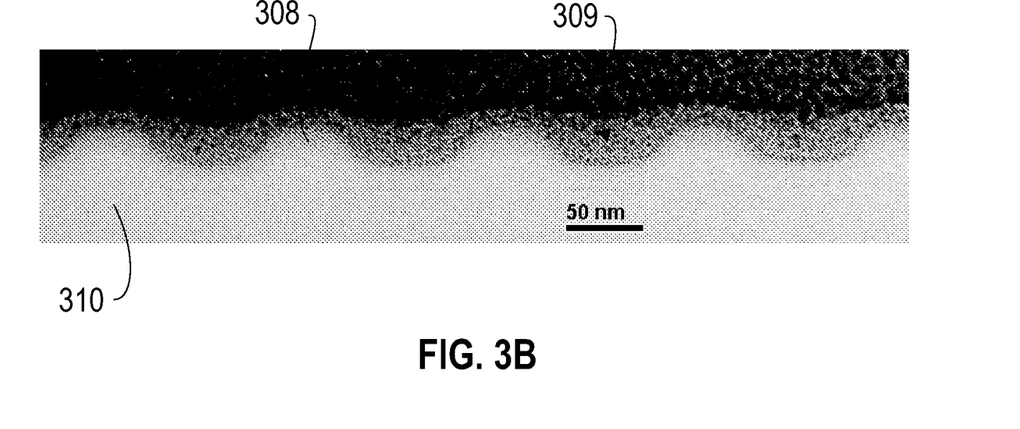
FIG. 3B is an TEM (transmission electron microscope) image of a cross-section of a substrate having an energetically neutral, corrugated surface layer, in accordance with embodiments of the present invention.

FIG. 3B is a TEM image of a cross-section of a substrate having an energetically neutral, corrugated surface layer 310 prepared using e-beam lithography, showing alternating grooves 309 and ridges 308.

The use of e-beam lithography is not meant to limit the technique that can be used to create the corrugated surface layer. Alternative processes may include but are not limited to chemical vapor deposition (CVD), plasma deposition, photolithography, sputtering, and any other means for depositing or creating a corrugated surface layer. A corrugated surface layer may be made energetically neutral by the deposition of a thin film of appropriate chemical composition. In addition, the corrugated surface layer may not necessarily be integrally disposed upon the substrate layer and may be a separate layer disposed thereon.

Figure 4:
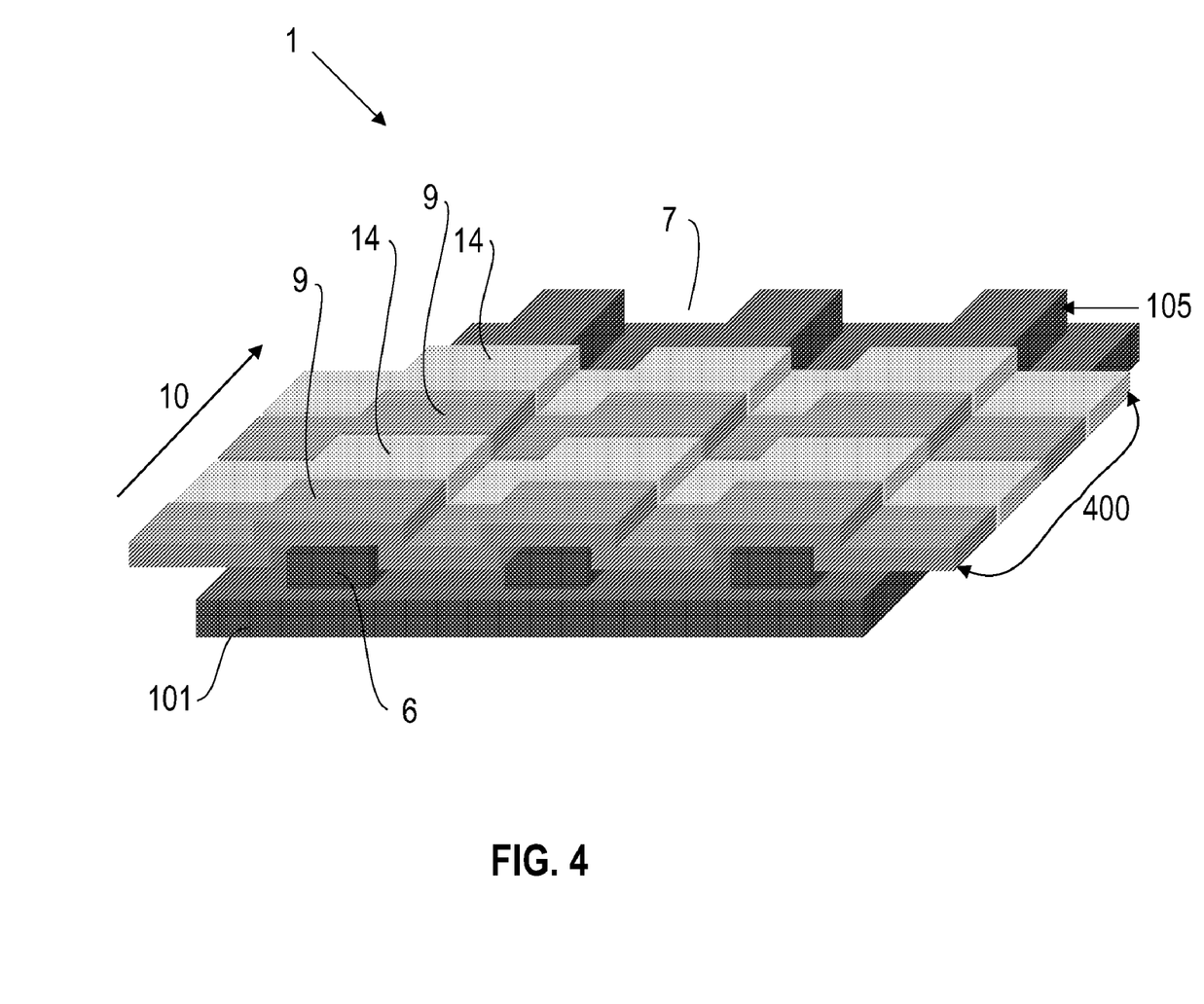
FIG. 4 depicts an embodiment of the present invention with a substrate having a corrugated, energetically neutral surface layer, in accordance with embodiments of the present invention.

FIG. 4 depicts an embodiment of the present invention with a substrate 1 having a corrugated, energetically neutral surface layer 105 which may be characterized by parallel ridges 6 separated by grooves 7, where the surface has been coated with a film 400 of a combination of di-block copolymer (A-b-B) and a third material, C, where C may be preferentially miscible with A (the first polymer block), and therefore may be dissolved in lamellar microdomains of the first polymer block. Lamellae of the polymer blocks of the di-block polymer within the film may assemble and be induced to align with respect to the direction of corrugation 10, due to the presence of C within the first polymer block, wherein a film of the di-block copolymer in the absence of the third material does not produce lamellae aligned with respect to the direction of corrugation. Self-assembled structures of the first polymer block 9 and self-assembled structures of the second polymer block 14, formed from aligned microdomains of aligned lamellae, may have an orientational direction that is both substantially normal to the direction of corrugation 10 and substantially parallel to the surface layer 105.

The rigidity of a first polymer block in the di-block copolymer may be controlled by the composition of the third material, where the third material may perform as a stiffening compound within the first block and increase the rigidity of the first polymer block. The rigidity or stiffness of the microdomains of said first polymer block, A, may be controlled by using a different third material.

The morphology of the microdomains is determined by the Flory-Huggins interaction parameter between polymers A and B, molecular weight, and the volume fraction of A (or B). For a given di-block copolymer system, volume fraction may be the main parameter to determine the morphology. In general, when the polymer chain length of A is approximately the same as the polymer chain length of B, the di-block copolymer may form lamellar microdomains. The combined volumetric fraction of the first block species and the third material may be in a range from about 0.65 to about 0.35.

Organic homopolymers, inorganic homopolymers, crosslinkable homopolymers, or a combination of these may be used as C. The nanostructure formed by the alignment of the lamellar microdomains of the di-block copolymer may be frozen when a crosslinkable homopolymer is used. When an inorganic material C is used, inorganic line patterns may be generated by removing the organic polymers of the di-block copolymer (or one select lamellar microdomain) using thermolysis, UV/ozone processing, supercritical $CO_2$ processing, solvent extraction, a dry etching process, a wet etching process, a combination thereof, or any other means for removing the organic polymers. The remaining material may form an oriented structure on the surface layer, since it may have been located only in the lamellar microdomains of the A polymer block prior to the removal of the di-block copolymer.

Figure 5:
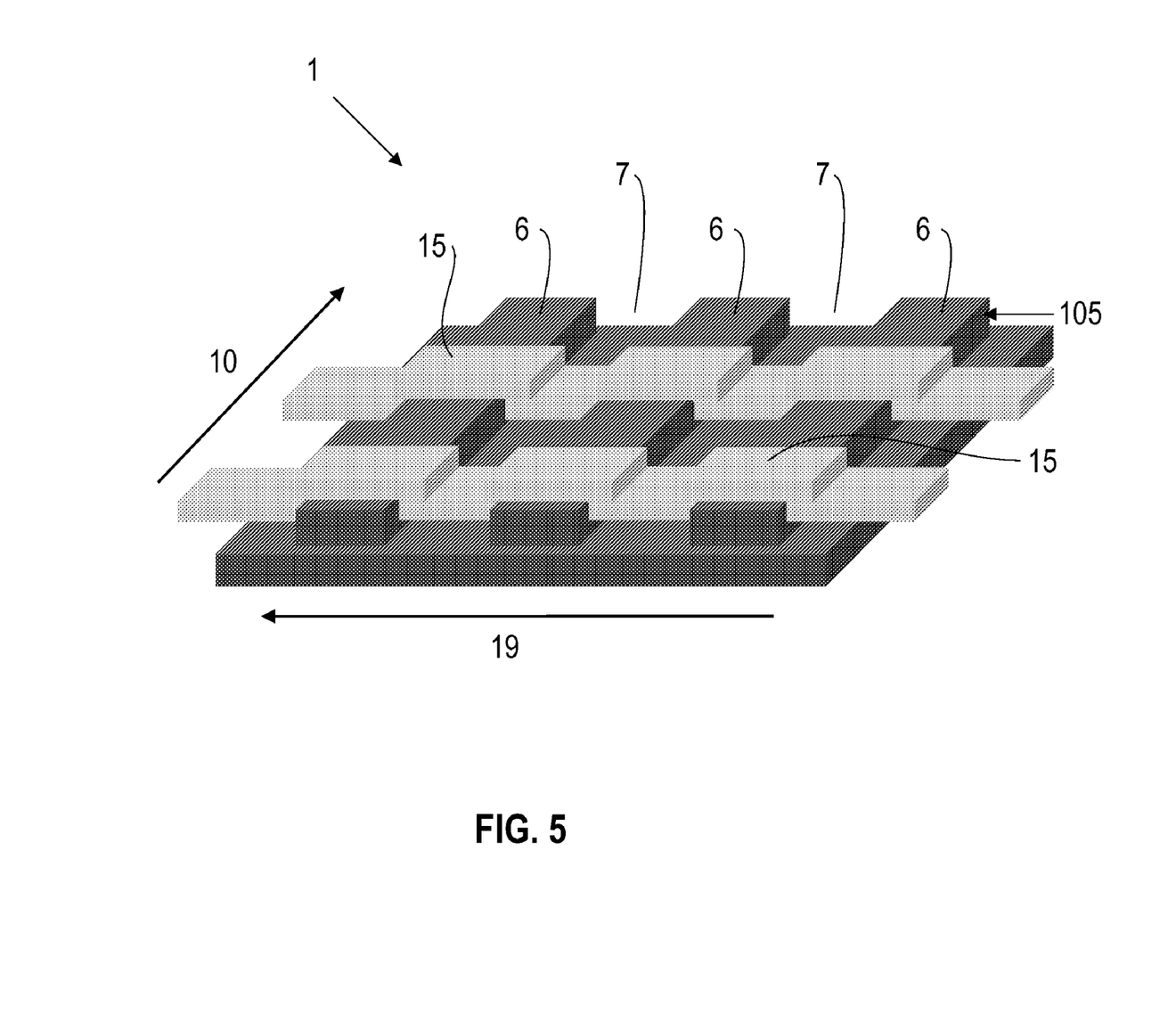
FIG. 5 depicts a substrate having an energetically neutral, corrugated surface layer whereupon an oriented structure remains on said surface, in accordance with embodiments of the present invention.

FIG. 5 depicts a substrate 1 having an energetically neutral, corrugated surface layer 105 which may be characterized by parallel ridges 6 separated by parallel grooves 7, whereupon an oriented structure 15, derived from 9 in FIG. 4, remains on said surface after the removal of at least one lamellar microdomain from the film. The structure 15 may have an orientational direction 19 substantially perpendicular to the direction of corrugation 10 and substantially parallel to the surface layer 105.

Figure 6:
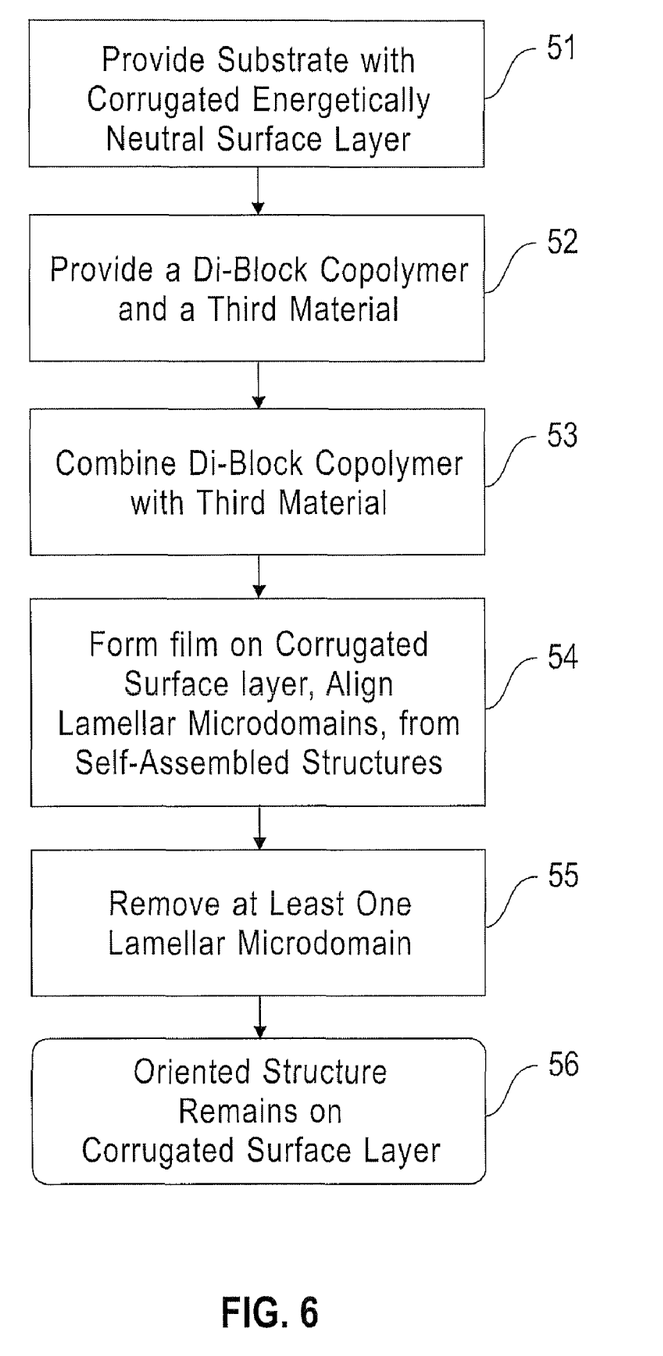
FIG. 6 is flowchart which illustrates generalized method steps, in accordance with embodiments of the present invention.

FIG. 6 is flowchart which illustrates generalized method steps 51-56 for an embodiment of the present invention. Step 51 provides a substrate with a corrugated energetically neutral surface layer such as in FIG. 1, FIG. 2, FIG. 3A and FIG. 3B. Step 52 provides a di-block copolymer and a third material. Step 53 combines the di-block copolymer with the third material. Step 54 forms a film on the corrugated surface layer, aligns lamellar microdomains and forms self-assembled structures as in FIG. 4. Step 55 removes at least one lamellar microdomain, resulting in oriented structures remain on the corrugated surface layer as in FIG. 5.

EXAMPLES

Figure 7:
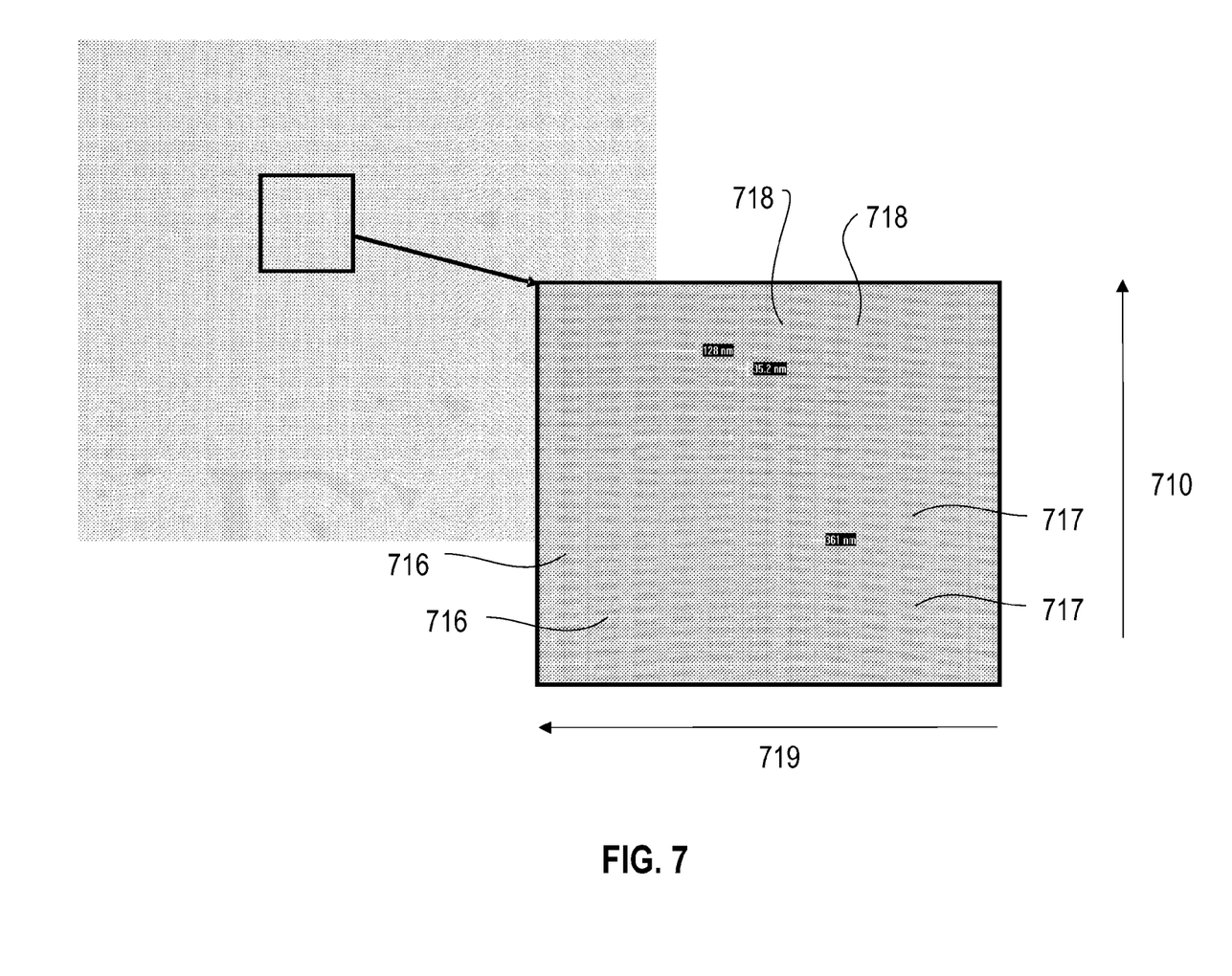
FIG. 7 is an SEM image of a structure on an energetically neutral corrugated surface layer of a substrate, in accordance with embodiments of the present invention

FIG. 7 is an SEM image of a structure on an energetically neutral corrugated surface layer of a substrate, formed from a film of a combination of an amphiphilic di-block copolymer, polystyrene-block-poly(ethylene oxide) (herein referred to as PS-b-PEO) and a third material, poly(methylsilsesquioxane), hereafter referred to as PMSSQ. The PS-b-PEO comprised a first block of a first polymer, PEO, and a second block of a second polymer, PS, where the molecular weight of the PS block was about 19,000 grams/mole (g/mol), and the molecular weight of the PEO block was about 12,300 g/mol. The composition of the PS-b-PEO may vary in the amount of PS block and PEO block present in the PS-b-PEO di-block copolymer, where the molecular weight of each block of the di-block copolymer may be in a range from about 1,500 g/mol to about 50,000 g/mol. The fractions of the monomer blocks present can be represented in percent millimoles (% mmol.), percent by weight (wt. %), volume fraction, and the like. The combined volumetric fraction of the PEO-PMSSQ block present in the combination was about 0.65. The PMSSQ provided is preferentially miscible with the PEO block of PS-b-PEO, and may act as a stiffening compound to increase the stiffness or rigidity of the PEO block in the di-block copolymer and the PEO microdomains in the formed film.

The combination of PS-b-PEO and PMSSQ was spin coated onto a substrate having a corrugated energetically neutral surface layer, at a spin speed of about 3,000 rotations per minute (rpm). The PMSSQ, which is more miscible with PEO than with PS, may preferentially migrate to the PEO lamellar microdomains. The volume fraction of PEO+PMSSQ phase, which is determined by the chain length of each block of the di-block copolymer and combination composition, may determine the morphology of the combinations. Horizontal light lines 716 in the image are the remaining inorganic structure after organic polymer has been removed by heating the film to 450° C. The vertical light lines 718 may be caused by a plurality of parallel ridges formed on the energetically neutral surface using e-beam lithography, prior to coating with the combination, and are characterized by a direction of corrugation 710. Dark horizontal lines 717 are gaps formed where the PS lamellar microdomains of the organic di-block copolymer were removed. Since the PMSSQ is selectively miscible in the PEO microdomains relative to the PS microdomains, removal of the PS microdomains leaves a space or gap. As seen in the images, the ordered structure remaining on the surface has an orientational direction 719 which is substantially normal to the direction of corrugation 710 and substantially parallel to the surface layer.

Figure 8:
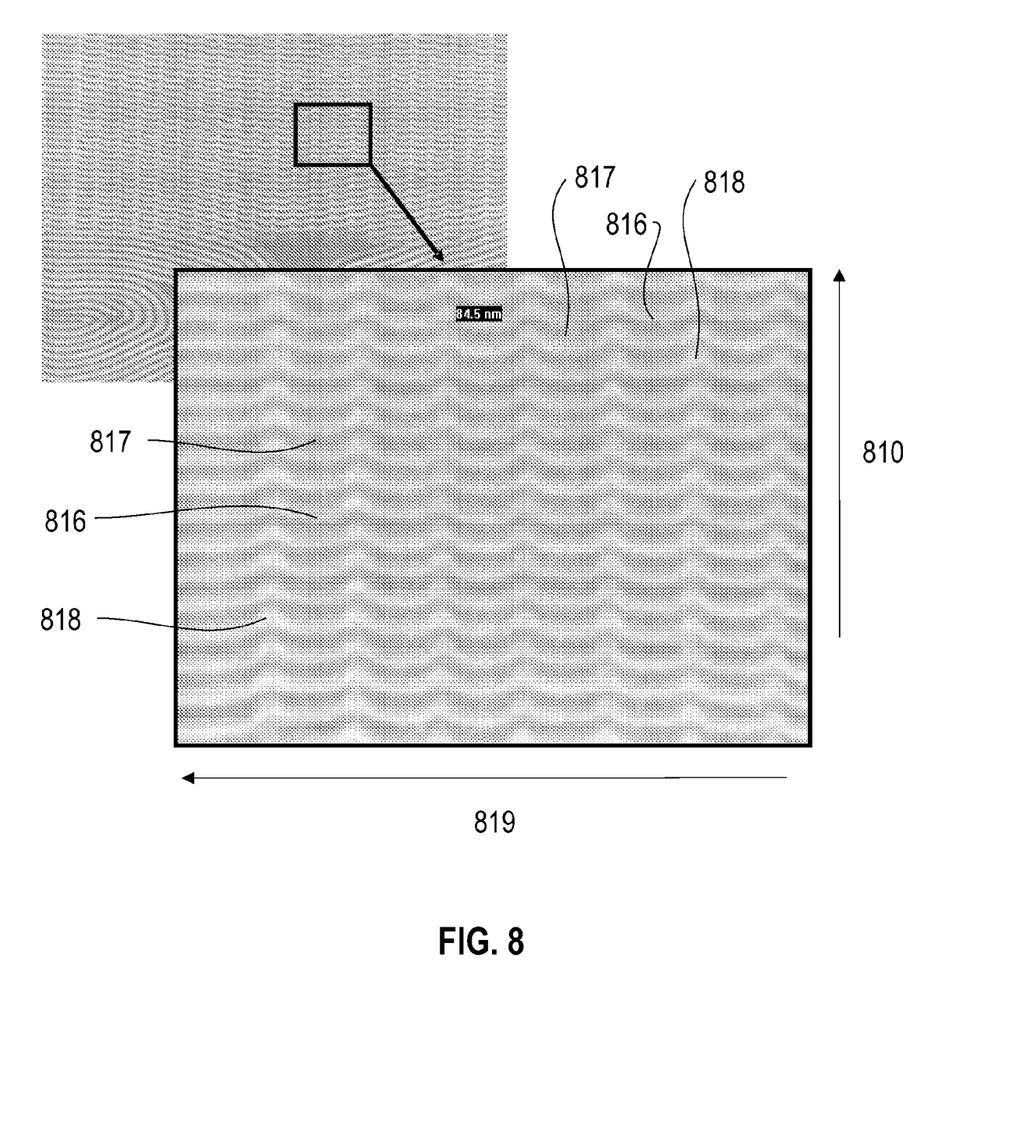
FIG. 8 is a tilted SEM image of a structure on an energetically neutral corrugated surface layer of a substrate, in accordance with embodiments of the present invention.

FIG. 8 is a tilted SEM image of a structure on an energetically neutral corrugated surface layer of a substrate, formed from a film of a combination of PS-b-PEO and PMSSQ, showing a perspective view of the structure's orientation direction 819 which is normal to the direction of corrugation 810, similar to the structures shown in FIG. 7. Light horizontal lines 816 are oriented structures remaining on the surface layer after removal of organic polymer by heating the sample to 450° C. Dark horizontal lines 817 are gaps between the remaining structures where organic polymer has been removed. The vertical light lines 818 may be caused by a plurality of parallel ridges formed on the energetically neutral surface layer using e-beam lithography, prior to coating with the combination, and are characterized by a direction of corrugation 810. As seen in the images, the ordered structure remaining on the surface layer 816 has an orientational direction 819 which is substantially normal to the direction of corrugation 810 and substantially parallel to the surface layer.

Figure 9:
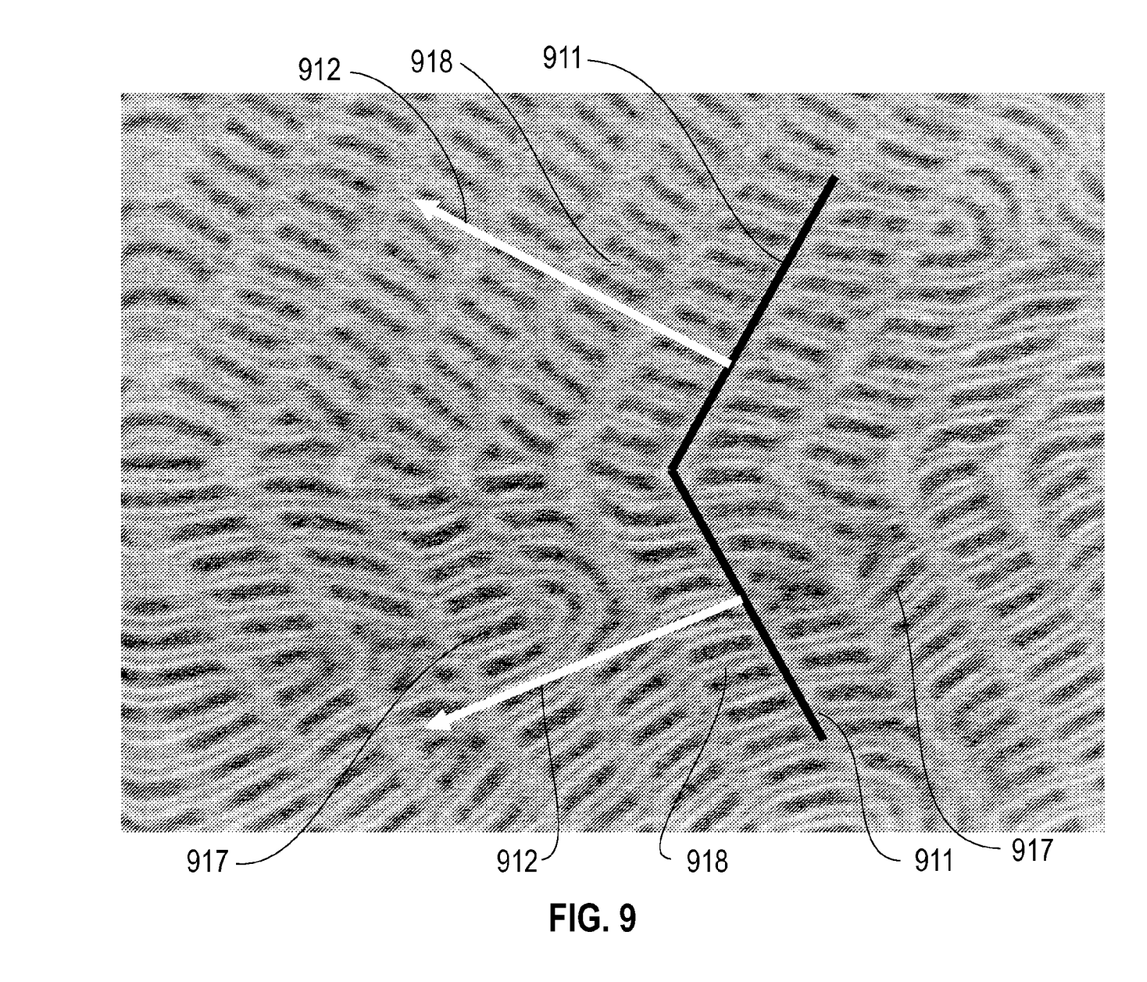
FIG. 9 is an SEM image of a structure on an energetically neutral, angled corrugated surface layer of a substrate, in accordance with embodiments of the present invention.

FIG. 9 is an SEM image of a structure on an energetically neutral, angled corrugated surface layer of a substrate, formed from a film of a combination of a PS-b-PEO di-block copolymer and PMSSQ. The combination of PS-b-PEO and PMSSQ was spin coated onto a substrate having a corrugated, energetically neutral surface layer, wherein the corrugated surface layer comprised a plurality of parallel ridges, the ridges having a shape of an angle. Dark lines 911, added to the image, illustrate the angled direction of corrugation. Light arrows 912, added to the image, show the orientational direction 912 of the self-assembled structures 918 remaining on the surface layer after the film has been heated to 450° C. to remove the organic polymer lamellar microdomains. Dark lines 917 are gaps formed where the PS lamellar microdomains of the organic di-block copolymer were removed.

The use of PS-b-PEO as the di-block copolymer is not meant to limit the type of the di-block copolymer that may be used in an embodiment of the present invention. The di-block copolymer may be but is not limited to an amphiphilic organic di-block copolymer, an amphiphilic inorganic block copolymer, a combination thereof, and the like. Specific examples of a first polymer may include but are not limited to poly(ethylene oxide) (or poly(ethylene glycol)), poly(propylene glycol), poly(alkylene oxides), poly(acrylic acids), poly(methacrylic acid), poly(dimethylamino ethylmethacrylate), poly(hydroxyalkyl methacrylates), poly(alkyleneoxide acrylates), poly(alkyleneoxide methacrylates), poly(hydroxyl styrenes), polycarbohydrates, poly(vinyl alcohols), poly(ethylene imines), polyoxazolines, polypeptides, poly(vinyl pyridines), polyacrylamides, poly(methyl vinyl ethers), poly(vinyl carboxylic acid amides), poly(N,N-dimethylacrylamides), and the like. Specific examples of a second polymer may include but are not limited to polystyrene, poly(α-methyl styrene), polynorbornene, polylactones, poly-lactides, polybutadiene, polyisoprene, polyolefins, polymethacrylates, polysiloxanes, poly(alkyl acrylates), poly(alkyl methacryaltes), polyacrylonitriles, polycarbonates, poly(vinyl acetates), poly(vinyl carbonates), polyisobutylenes, and the like. Di-block copolymers formed from the aforementioned first and second polymers may be used individually and in combinations thereof in accordance with the method of the present invention.

The use of PMSSQ as the third material in this example also is not meant to limit the type of the crosslinkable polymer that may be used in an embodiment of the present invention. Other materials that may be used include but are not limited to an inorganic homopolymer, an organic homopolymer, a crosslinkable homopolymer, a combination thereof, and the like. The crosslinkable homopolymer may be silsesquioxane having the formula $(RSiO_{1.5})_n$, wherein R may be a hydrido group or an alkyl group having 1 to 3 carbon atoms, wherein n may be in a range from about 10 to about 500, and wherein the crosslinkable homopolymer may have a molecular weight in a range from about 600 to about 30,000. Other crosslinkable homopolymers may include organic crosslinkable polymers; inorganic crosslinkable polymers; thermosetting crosslinkable polymers such as epoxy resins, phenolic resins, amino resins, bis-maleimide resins, dicyanate resins, allyl resins, unsaturated polyester resins, polyamides, and the like; photosetting crosslinkable polymers; polysilanes; polygermanes; carbosilanes; borazoles; carboranes; amorphous silicon carbides; carbon doped oxides; and the like. The aforementioned crosslinkable polymers may be used individually and in combinations thereof in accordance with the method of the present invention.

The combination of the di-block copolymer and the third material may be formed in a solvent solution and cast as a solution, which may require solvent removal for complete film formation. A thin film of the combination may be spin coated onto a substrate, where a spin speed may be in a range from about 50 rpm to about 5,000 rpm. The combination may be spin coated at room temperature without a post-drying process. Alternatively, a film sample on a substrate may be thermally annealed, after forming the film, at a temperature of about 100° C. for about 10 hours, for example. Also, a film sample on a substrate may be vapor annealed, after forming the film on the substrate, by annealing the adhering film under organic solvent vapor at room temperature (about 25° C.) from about 10 hours to about 15 hours, for example. Lamellar microdomains may assemble during or after film formation on the corrugated surface layer. Likewise, formation of the associated self-assembled structures may occur during formation of the di-block copolymer film or after the film has been formed and the corrugated surface.

The spin coating process used is not meant to limit the type of processes that may be used in an embodiment of the present invention. Other processes such as chemical vapor deposition (CVD), photochemical irradiation, thermolysis, spray coating, dip coating, doctor blading, and the like may be used individually and in combinations thereof in accordance with the method of the present invention.

The formation of the self-assembled structures of lamellar microdomains in an orientational direction may be accomplished by forming the film on the substrate, thermal annealing after forming the film on the substrate, vapor annealing after forming said film on the substrate, a combination thereof, or any other process which provides a means for forming the structures.

After the film is formed, at least one lamellar microdomain may be removed from the film, leaving an oriented structure remaining on the surface layer. For example, if the stiffening compound, which is selectively miscible with one block of the di-block-copolymer, is an inorganic homopolymer, the film and substrate may be heated between about 350° C. and about 600° C. to remove all organic polymers from the film. The remaining inorganic oriented structure may have substantially the same orientational direction as the associated self-assembled structures in which the inorganic homopolymer was mixed, where the orientational direction is substantially normal to the direction of corrugation, and substantially parallel to the surface layer.

Removing at least one lamellar microdomain by heating the film is not meant to limit the type of processes that may be used. Other processes that may be used include thermolysis, UV/ozone processing, supercritical $CO_2$ processing, solvent extraction, a dry etching process, a wet etching process, and the like may be used individually and in combinations thereof in accordance with methods of the present invention.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A method, comprising:
   providing a di-block copolymer, said di-block copolymer comprising a first block of a first polymer, said first block being covalently bonded to a second block of a second polymer to form a repeating unit of the di-block copolymer, said first and second polymers being different;
   providing a substrate having an energetically neutral surface layer, said surface layer having a corrugation integrally disposed thereon, said corrugation characterized by a direction of corrugation;
   providing a third material, said third material being miscible with said first polymer;
   combining said di-block copolymer with said third material to form a combination of said di-block copolymer and said third material;
   forming a film of said combination onto said corrugated surface layer; and
   assembling lamellar microdomains of said di-block copolymer within said film, said microdomains forming self-assembled structures within said film, said structures having an orientational direction substantially normal to said direction of corrugation and substantially parallel to said surface layer, wherein presence of said third material within said first block induces lamellar microdomains of said di-block copolymer to align with respect to said corrugated surface layer, after said film is formed on said corrugated surface layer.

2. The method of claim 1, wherein the combined volumetric fraction of said third material and said first polymer with respect to said di-block copolymer is within a range from about 0.35 to about 0.65.

3. The method of claim 1, wherein said corrugation comprises at least one ridge, said ridge having a peak height of about 10 nanometers (nm) to about 50 nm, said ridge having a base width of about 10 nm to about 50 nm, said ridge having a minimum length of about 40 nm.

4. The method of claim 3, wherein said at least one ridge is a plurality of ridges, adjacent ridges of said plurality of ridges being separated by a distance within a range from about 50 nm to about 500 nm.

5. The method of claim 1, where said forming self-assembled structures is selected from the group consisting of forming said film on said substrate, thermal annealing after forming said film on said substrate, vapor annealing after forming said film on said substrate, and a combination thereof.

6. The method of claim 1, where said third material is a homopolymer that increases the rigidity of lamellar microdomains of said first block, wherein said homopolymer is an organic homopolymer, an inorganic homopolymer, a crosslinkable homopolymer, or a combination thereof.

7. The method of claim 1, where said forming said film is selected from the group consisting of dip coating said film, spray coating said film, spin coating said film, and combinations thereof.

8. The method of claim 1, wherein said di-block copolymer is an amphiphilic organic di-block copolymer, an amphiphilic inorganic di-block copolymer, or a combination thereof.

9. The method of claim 8, wherein said first polymer is selected from the group consisting of poly(ethylene oxide), poly(propylene glycol), poly(alkylene oxides), poly(acrylic acids), poly(methacrylic acid), poly(dimethylamino ethylmethacrylate), poly(hydroxyalkyl methacrylates), poly(alkyleneoxide acrylates), poly(alkyleneoxide methacrylates), poly(hydroxyl styrenes), polycarbohydrates, poly(vinyl alcohols), poly(ethylene imines), polyoxazolines, polypeptides, poly(vinyl pyridines), polyacrylamides, poly(methyl vinyl ethers), poly(vinyl carboxylic acid amides), and poly(N,N-dimethylacrylamides), wherein said second polymer is selected from the group consisting of polystyrene, poly($\alpha$-methyl styrene), polynorbornene, polylactones, polylactides, polybutadiene, polyisoprene, polyolefins, polymethacrylates, polysiloxanes, poly(alkyl acrylates), poly(alkyl methacryaltes), polyacrylonitriles, polycarbonates, poly(vinyl acetates), poly(vinyl carbonates), and polyisobutylenes, wherein said third material is selected from the group consisting of an inorganic homopolymer, an organic homopolymer, a crosslinkable homopolymer, and combinations thereof, wherein if said third material is said crosslinkable homopolymer then said crosslinkable homopolymer is a silsesquioxane having the formula $(RSiO_{1.5})_n$, wherein R is selected from the group consisting of a hydrido group and an alkyl group, wherein n is in a range from about 10 to about 500, and wherein said crosslinkable homopolymer has a molecular weight in a range from about 600 grams/mole (g/mol) to about 30,000 g/mol.

10. A method, comprising:
    providing a substrate, said substrate comprising a surface layer having an energetically neutral corrugated surface that has a corrugation integrally disposed thereon, said corrugation characterized by a direction of corrugation;
    forming a film on said corrugated surface layer, said film comprising a combination of a di-block copolymer and a stiffening compound, said di-block copolymer comprising lamellar microdomains of a first polymer block and lamellar microdomains of a second polymer block, where said stiffening compound is preferentially miscible in said first polymer block relative to said second polymer block, is dissolved within said first polymer block, and increases a rigidity of the lamellar microdomains of said first polymer block; and
    removing at least one lamellar microdomain from said film such that an oriented structure remains on said surface layer, wherein the oriented structure is oriented substantially perpendicular to the direction of corrugation.

11. The method of claim 10, where said corrugated surface layer comprises a plurality of parallel ridges, said ridges having a shape of an arc.

12. The method of claim 10, where said stiffening compound is a silsesquioxane having the formula $(RSiO_{1.5})_n$, wherein R is selected from the group consisting of a hydrido group and an alkyl group, wherein n is in a range from about 10 to about 500, and wherein said crosslinkable homopolymer has a molecular weight in a range from about 600 g/mol to about 30,000 g/mol.

13. The method of claim 10, where said removing at least one lamellar microdomain comprises using a process selected from the group consisting of UV/ozone processing, supercritical $CO_2$ processing, solvent extraction, a dry etching process, a wet etching process, and combinations thereof.

14. The method of claim 10, wherein said di-block copolymer is an amphiphilic inorganic di-block copolymer.

15. The method of claim 14, wherein said stiffening compound is an inorganic homopolymer, and wherein said removing at least one lamellar microdomain comprises removing all organic polymer from said film by heating said film to a temperature between 350° C. and 600° C.

16. The method of claim 10, where said corrugated surface layer is prepared using e-beam lithography.

17. The method of claim 10, where said at least one lamellar microdomain is selected from the group consisting of said lamellar microdomains of said first polymer block and said lamellar microdomains of said second polymer block.

18. The method of claim 10, wherein the energetically neutral corrugated surface has a chemical and morphological composition affording substantially no preferential or selective affinity for either polymer block of the first polymer block and the second polymer block.

19. The method of claim 10, wherein presence of said stiffening compound within said first polymer block induces said lamellar microdomains to align with respect to said corrugated surface layer, after said film is formed on said corrugated surface layer.

20. A method, comprising:
providing a substrate, said substrate having an energetically neutral corrugated surface layer, said corrugated surface layer having a corrugated surface comprising a plurality of parallel ridges, said corrugated surface characterized by a direction of corrugation, each ridge of said plurality of ridges having a shape of an arc;
spin coating a film on said corrugated surface layer, said film comprising a combination of a di-block copolymer and a stiffening compound, said di-block copolymer comprising lamellar microdomains of a first polymer block comprising poly(ethylene oxide) and lamellar microdomains of a second polymer block comprising poly(α-methyl styrene), said stiffening compound comprising a silsesquioxane polymer having the formula $(RSiO_{1.5})_n$ where R is an alkyl group having three carbon atoms and n is in a range from about 10 to about 500, wherein said stiffening compound is dissolved within said first polymer block resulting in said lamellar microdomains forming self-assembled structures within said film, said structures having a first orientational direction substantially normal to said direction of corrugation and substantially parallel to said surface layer, presence of said stiffening compound within said first block inducing said lamellar microdomains of said di-block copolymer to align with respect to said corrugated surface layer, after said film is formed on said corrugated surface layer; and
removing all organic polymer from said film by heating said film to a temperature between about 350° C. and about 600° C. such that an oriented inorganic structure from said stiffening compound remains on said surface layer, said oriented inorganic structure having a second orientational direction substantially normal to said direction of corrugation and substantially parallel to said corrugated surface layer.

* * * * *